United States Patent
Sercel et al.

(10) Patent No.: US 8,378,258 B2
(45) Date of Patent: Feb. 19, 2013

(54) SYSTEM AND METHOD FOR LASER MACHINING

(75) Inventors: Patrick J. Sercel, Brentwood, NH (US); Jeffrey P. Sercel, Hollis, NH (US)

(73) Assignee: IPG Microsystems LLC, Manchester, NH (US)

( * ) Notice: Subject to any disclaimer, the term of this patent is extended or adjusted under 35 U.S.C. 154(b) by 1736 days.

(21) Appl. No.: 11/195,348

(22) Filed: Aug. 2, 2005

(65) Prior Publication Data

US 2007/0017908 A1 Jan. 25, 2007

Related U.S. Application Data

(60) Provisional application No. 60/598,145, filed on Aug. 2, 2004, provisional application No. 60/599,737, filed on Aug. 6, 2004.

(51) Int. Cl.
*B23K 26/40* (2006.01)

(52) U.S. Cl. ......... 219/121.69; 219/121.73; 219/121.75; 219/121.77

(58) Field of Classification Search ............ 219/121.63–121.73, 121.85, 121.63–121.77
See application file for complete search history.

(56) References Cited

U.S. PATENT DOCUMENTS

| | | | | |
|---|---|---|---|---|
| 3,538,298 A | * | 11/1970 | Clapp et al. | 219/121.69 |
| 4,258,246 A | * | 3/1981 | Karube et al. | 219/121.8 |
| 4,273,398 A | * | 6/1981 | Summers et al. | 445/43 |
| 4,304,978 A | * | 12/1981 | Saunders | 219/121.6 |
| 4,739,148 A | * | 4/1988 | Kawazu et al. | 219/121.85 |
| 4,874,919 A | * | 10/1989 | Bransden et al. | 219/121.68 |
| 5,084,300 A | * | 1/1992 | Zander et al. | 505/474 |
| 5,103,073 A | * | 4/1992 | Danilov et al. | 219/121.68 |
| 5,112,438 A | * | 5/1992 | Bowers | 216/48 |
| 5,149,937 A | * | 9/1992 | Babel et al. | 219/121.68 |
| 5,159,172 A | * | 10/1992 | Goodman et al. | 219/121.68 |
| 5,345,057 A | * | 9/1994 | Muller | 219/121.71 |
| 5,369,659 A | * | 11/1994 | Furumoto et al. | 372/50.23 |
| 5,395,718 A | * | 3/1995 | Jensen et al. | 430/5 |
| 5,414,239 A | * | 5/1995 | Terabayashi et al. | 219/121.73 |
| 5,486,546 A | | 1/1996 | Mathiesen et al. | 522/165 |

(Continued)

FOREIGN PATENT DOCUMENTS

DE 4305107 A1 * 8/1994
EP 0815804 A1 * 7/1998

(Continued)

OTHER PUBLICATIONS

International Search Report with Written Opinion dated Aug. 10, 2006 in corresponding PCT Patent Application No. PCT/US05/27435 (9 pages).

(Continued)

*Primary Examiner* — Samuel M Heinrich
(74) *Attorney, Agent, or Firm* — Grossman Tucker Perreault & Pfleger, PLLC

(57) ABSTRACT

A laser machining system and method uses a shaped laser beam, such as a long, narrow beam, and effectively scans the beam in the narrow direction across a mask having an aperture pattern. The pattern on the mask is imaged onto a moving workpiece and the patterned laser beam selectively removes material from the workpiece. The workpiece may be moved using a coordinated synchronized rotational motion. The laser may use a longer wavelength (e.g., 248 nm) and the beam may be scanned at a high rate of speed to reduce the dissipation of the residual thermal energy in the material being machined. In one embodiment, this system and method may be used to machine a complex pattern into a curved surface with relatively high resolution and high speeds.

12 Claims, 2 Drawing Sheets

U.S. PATENT DOCUMENTS

| | | | |
|---|---|---|---|
| 5,654,553 A | | 8/1997 | Kawakubo et al. |
| 5,708,252 A | * | 1/1998 | Shinohara et al. ........ 219/121.73 |
| 5,741,429 A | * | 4/1998 | Donadio et al. ................... 216/8 |
| 5,849,043 A | * | 12/1998 | Zhang et al. ................... 29/25.01 |
| 5,891,764 A | * | 4/1999 | Ishihara et al. ................ 438/151 |
| 5,925,069 A | * | 7/1999 | Graves et al. ..................... 607/36 |
| 5,982,583 A | * | 11/1999 | Strom ......................... 360/234.3 |
| 5,998,097 A | * | 12/1999 | Hatakeyama et al. ......... 430/296 |
| 6,061,375 A | | 5/2000 | Zhang et al. ...................... 372/58 |
| 6,086,773 A | * | 7/2000 | Dufresne et al. ................... 216/8 |
| 6,130,009 A | | 10/2000 | Smith et al. |
| 6,222,157 B1 | | 4/2001 | Langille et al. |
| 6,329,229 B1 | * | 12/2001 | Yamazaki et al. ............. 438/166 |
| 6,464,692 B1 | * | 10/2002 | Ruiz et al. ........................... 606/5 |
| 6,534,741 B2 | * | 3/2003 | Presby .................... 219/121.69 |
| 6,537,459 B1 | * | 3/2003 | Dufresne et al. ................... 216/8 |
| 7,390,704 B2 | * | 6/2008 | Tanaka ........................... 438/166 |
| 2002/0125234 A1 | * | 9/2002 | Chen et al. ............... 219/121.76 |
| 2002/0170895 A1 | | 11/2002 | Hauer et al. |

FOREIGN PATENT DOCUMENTS

| | | | |
|---|---|---|---|
| JP | 403217803 | | 9/1991 |
| JP | 07009504 A | * | 1/1995 |
| JP | 02001079678 A | * | 3/2001 |
| JP | 02001162392 A | * | 6/2001 |
| JP | 2001162392 A | * | 6/2001 |
| JP | 2003277914 | | 10/2003 |
| JP | 409051104 | | 11/2006 |

OTHER PUBLICATIONS

Todd Lizotte and S. Collar Waters, "UV Laser R&D Applied to Traditional Printing", pp. 57-59, Gravure, Jun. 2002.

Todd Lizotte et al., "Laser Drilling Speeds BGA Packaging", pp. 1-5, Solid State Technology, Sep. 1996.

Todd E. Lizotte, "Beam Shaping for Microvia Drilling", pp. 28-33, PC FAB, Feb. 2003.

* cited by examiner

SYSTEM AND METHOD FOR LASER MACHINING

CROSS-REFERENCE TO RELATED APPLICATIONS

This application claims the benefit of U.S. Provisional Patent Application Ser. No. 60/598,145, filed on Aug. 2, 2004 and U.S. Provisional Patent Application Ser. No. 60/599,737, filed on Aug. 6, 2004, both of which are fully incorporated herein by reference.

TECHNICAL FIELD

The present invention relates to laser machining and more particularly, to a laser machining system and method capable of machining sensitive materials and creating complex patterns on a curved surface.

BACKGROUND INFORMATION

Lasers have been used to perform cutting, etching, and other types of machining operations on various types of structures made of various types of materials. In particular, lasers can be used to micromachine complex patterns on structures. When a laser pulse hits a structure, the laser energy may cause material to be removed. A structure may be machined by using the laser to selectively remove material according to the desired pattern. The operating characteristics and parameters of the laser (e.g., wavelength, pulse rate, energy density) may be controlled to control the laser energy and thus the amount of material removed. Some structures, such as biomedical devices, may be difficult to machine using a laser because of the material and/or the shape of the structure.

In general, laser ablation is the removal of thin layers (usually sub micron) of material at low fluence levels, where the ablated material carries at least some of the residual heat away from the remaining workpiece. Fluence may be defined as energy density per laser pulse and energy density is generally defined as the intensity of an individual laser pulse focused onto a workpiece. The fluence multiplied by pulses per second is generally referred to as power density.

The ablation threshold is the practical energy density where detectable amounts of material begin to be removed. When the energy density is above the ablation threshold of a material, the material will be ejected and will carry away excess or residual heat energy. Below the ablation threshold, the laser energy is converted into heat within the material. As the ablation depth increases, the energy density threshold may increase and the residual heat penetration may increase (i.e. the laser energy transmitted into the depth of the material not ablated). In general, optimum fluence is the fluence level that provides the highest efficiency of material removal and the lowest percentage of residual heat left in the material after ablation. Excessive fluence is the higher range of fluences where the etch rate becomes saturated and excess energy is converted into heat in the remaining material adjacent to and below the etched or ablated volume.

Residual heat penetration during ablation may affect the resolution of the features that are machined. In general, high resolution is ability to generate fine features, for example, using laser ablation with little or no detectable melting as compared to the sizes of the features desired. Heat free or cool excimer laser ablation may use low energy densities to strip fine (e.g., sub-micron) layers with high resolution such that excess heat may be carried away primarily in the ablated materials and the residual heat left in the remaining materials is low enough to substantially eliminate melting.

Certain types of materials may be more difficult to machine with lasers than others. Sensitive materials are normally not easily processed at longer wavelengths (e.g., at 248 nm) due to optical and thermal effects. Sensitive materials generally have an optical absorption at the 248 nm wavelength that is low compared to the optical absorption at the 222 nm, 193 nm or 157 nm wavelengths. Sensitive material may also have a relatively low thermal capacity and/or low melting point, i.e., it will melt and deform with low heat input (or low power density). Examples of sensitive materials include, but are not limited to, polymers, other low density organic materials such as PMMA, collagen, living tissue such as the cornea, resorbable polymers, types of nylon, delrin, PET, Mylar and the like.

As an example, a sensitive material, such as PMMA, has an OAC of about 65 cm$^{-1}$ at 248 nm and about $2.0 \times 10^3$ cm$^{-1}$ at 193 nm, and also has a relatively low melting temperature. Using existing laser machining systems, PMMA may be effectively processed at 193 nm with good resolution at moderate power densities but may only be marginally processed at 248 nm. In contrast, a non-sensitive material that may be processed at 248 nm, such as polyimide, has an optical absorption coefficient (OAC) of about $2.8 \times 10^5$ cm$^{-1}$ at 248 nm and about $4.2 \times 10^5$ cm$^{-1}$ at 193 nm. Polyimide can be effectively processed, with little or no melting, at high repetition rates (i.e., >400 Hz) at 248 nm due to its strong absorption at that wavelength. Polyimide also has a relatively high melting temperature and can also withstand higher power densities.

When a laser is used to machine thermally sensitive polymers, the material surrounding the area being machined has a tendency to melt or deform under laser irradiation. During laser ablation, the low optical absorption coefficient (OAC) of the sensitive material results in a deeper penetration depth of the laser energy into the material and therefore a larger volume of material is removed with each laser pulse, which may require the laser fluence (i.e., energy density per laser pulse) to be higher. In other words, if the absorption depth of a material is relatively large (e.g., as compared to a heat free excimer laser processing condition), the energy density required to ablate the material also increases. The longer absorption depth coupled with the higher required ablation threshold energy density may result in a larger etch depth per laser pulse and may also result in a larger residual heat which consequently remains in the material adjacent to the etch zone after ablation.

To avoid damage or degradation due to thermal effects, therefore, some laser machining techniques have been carefully designed to use a specific wavelength and/or energy density that will minimize thermal effects. In some applications, for example, a wavelength of 193 nm is used to process sensitive materials, such as resorbable polymers, because of the stronger absorption at the shorter 193 nm wavelength. Machining using a 248 nm laser, however, has other advantages over a 193 nm laser. A 248 nm laser produces higher laser power for essentially the same cost as a 193 nm laser. The beam delivery system of a 248 nm laser may be less expensive due to the ability of 248 nm to be transmitted through air while a 193 nm laser may require a sealed and N$_2$ purged beam delivery system. The beam delivery optics for a 248 nm laser generally cost less and last longer than for 193 nm lasers. The operation cost of a 248 nm laser may also be lower due to a longer life of the laser resonator and beam splitter optics, the laser tube component and the laser gas fill and due to lower stress on high voltage components. The 248 nm laser may also be intrinsically more stabile in terms of power and energy fluctuations than the 193 nm laser.

Thus, a 248 nm laser may provide advantages in laser machining applications but may have drawbacks when used to machine sensitive materials. In particular, the achievable resolution may be limited due to the melting effects. Sensitive materials may be effectively processed using a 248 nm laser at low power density, (i.e., low laser pulse repetition rates) if the power density is low enough to allow time for the residual laser energy to dissipate within the material. However, this limits the effective processing speed for the sensitive materials and therefore limits the economics for high volume production applications.

Increased power density directly relates to material heating and therefore the melting and thermal effects generated during laser processing. Power density can be reduced, for example, by reducing the pulse repetition rate or by reducing the amount of time the material is exposed to the high repetition rate laser. Thus, a fast scanning speed of the workpiece under a laser beam can reduce the effective, local power density delivered to that workpiece. When using fast scanning speeds, however, the ability to image complex non-repeating features over a large area may be difficult due to the optics required to image a large area with high optical resolution. Machining complex patterns may be even more difficult on certain shapes, such as a curved surface on a cylindrical structure.

BRIEF DESCRIPTION OF THE DRAWINGS

These and other features and advantages will be better understood by reading the following detailed description, taken together with the drawings wherein.

DETAILED DESCRIPTION

In general, a laser machining system and method, consistent with embodiments of the present invention, uses a shaped laser beam, such as a long, narrow beam, and scans the beam across a mask having an aperture pattern. The pattern on the mask is imaged onto a workpiece and the patterned laser beam selectively removes material from the workpiece. The laser may use a longer wavelength (e.g., 248 nm) and the beam may be scanned at a high rate of speed to reduce the dissipation of the residual thermal energy in the material, as will be described in greater detail below.

In one application, an exemplary system and method may be used to machine a complex pattern with relatively high resolution and high speeds into a curved surface of a rotating workpiece using a technique referred to as rotational coordinated opposing motion (COMO). The workpiece in the exemplary application may be made of a sensitive material. As used herein, sensitive material refers to a material that has an optical absorption coefficient at a 248 nm wavelength that is less than about $2 \times 10^3$ cm$^{-1}$. Examples of sensitive materials include, but are not limited to, polymers, other low density organic materials such as PMMA, collagen, living tissue such as the cornea, resorbable polymers, types of nylon, delrin, PET, Mylar and the like.

Figure 1:
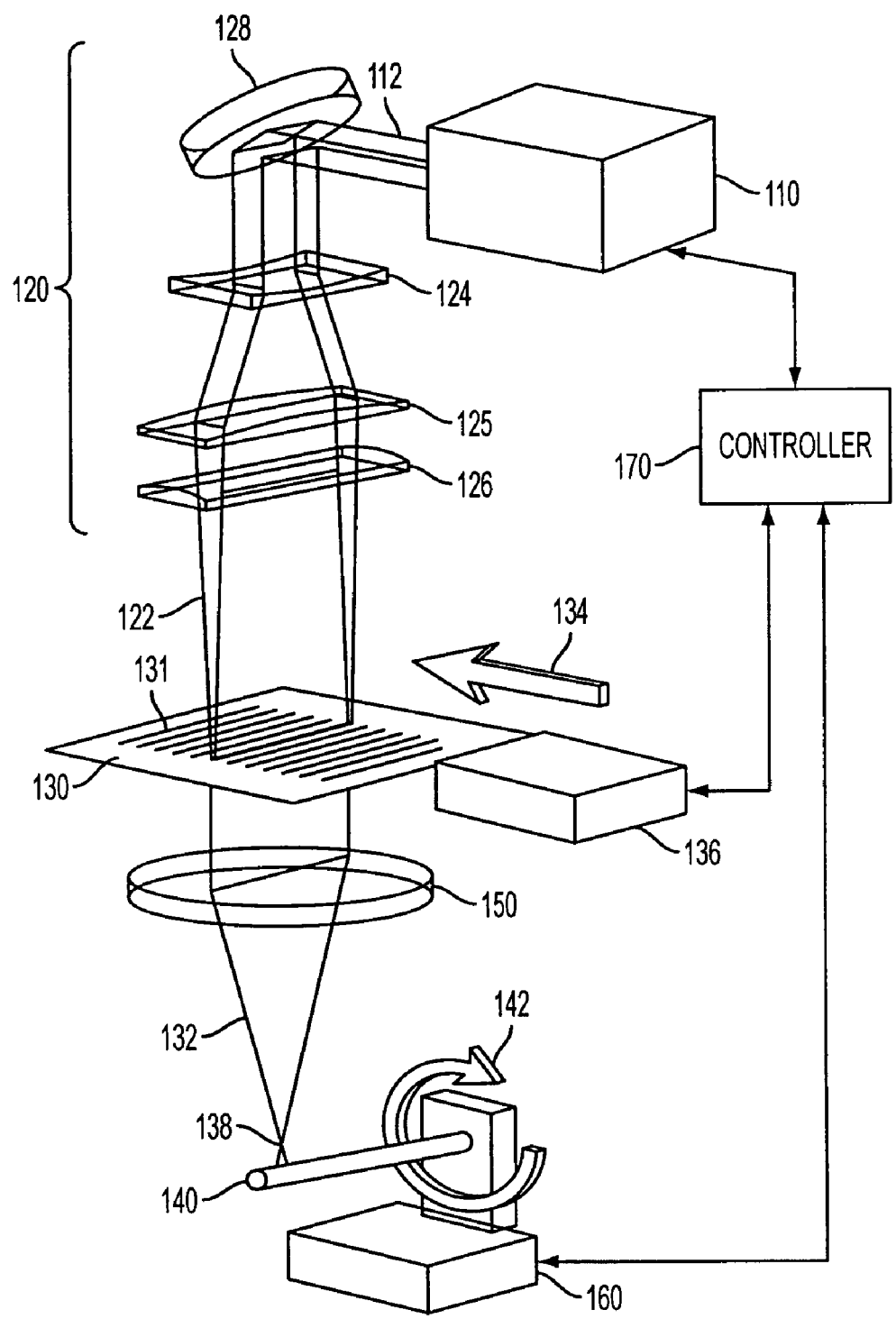
FIG. 1 is a schematic diagram illustrating a laser machining system and method, consistent with one embodiment of the present invention.

Referring to FIG. 1, one embodiment of the laser machining system and method is described in greater detail. A laser 110 may generate a raw beam 112 and a beam delivery system 120 may shape the raw beam 112 into a tightly focused line shaped beam 122 that is relatively long and narrow. The line shaped beam 122 may expose a patterned mask 130 by scanning across the mask 130 to produce a patterned beam 132 that may be focused onto a workpiece 140. The workpiece 140 may be moving in coordination with the scanning of the mask 130 such that the patterned beam 132 is imaged onto the workpiece 140 in a pattern corresponding to the pattern on the mask 130. The patterned beam 132 may thus remove material from the workpiece 140 in a pattern corresponding to the pattern on the mask 130, thereby machining the workpiece 140. As used herein, machining refers to cutting through the workpiece by removing an entire section of material or etching the workpiece by removing only a portion of the material.

In one embodiment, the laser 110 may be an excimer laser producing a 248 nm wavelength at repetition rates in a range of about 1 Hz to 1 kHz and preferably in excess of about 200 Hz and at an energy density in a range of about 500 mJ/cm$^2$ to 5000 mJ/cm$^2$ and preferably about 2000 mJ/cm$^2$. Raw beam energy may also be added using techniques known to those skilled in the art. The laser 110 may be controlled using a precision fire-on-the-fly laser pulse control technique, as known to those skilled in the art, to synchronize laser pulses to the movement of the workpiece 140.

The use of a 248 nm wavelength focused at relatively higher energy density and with higher repetition rates results in higher effective etch rates, particularly in sensitive materials, as compared to shorter wavelengths (e.g., 193 nm). The 248 nm wavelength is thus capable of providing a faster process, resulting in fewer laser pulses required to process a certain part. At the higher wavelength, repetition rate and energy density, thermal effects in sensitive materials may be minimized because of the laser beam shape geometry, the direction of scanning, and the precision fire-on-the-fly laser pulse control. Although an exemplary embodiment uses a wavelength of 248 nm, other wavelengths may also be used including, but not limited to, 193 nm, 157 nm, 308 nm, and 351 nm.

One embodiment of the beam delivery system 120 may include a cylindrical plano-concave lens 124 that expands the length of the beam in one axis or direction (i.e., the long direction), and a cylindrical plano-convex lens 125 that collimates the expanded beam in the same axis or direction. A cylindrical plano-convex lens 126 may also be used to focus the collimated beam and to narrow the width of the beam in another axis or direction (i.e., the narrow direction) to produce the tightly focused line shaped beam 122. The beam delivery system 120 may also include at least one mirror 128 to direct the raw beam 112 toward the lenses 124, 125, 126. Those skilled in the art will recognize that other optical components and/or other configurations of optical components may also be used in the beam delivery system 120 to provide a line shaped beam.

The beam may be expanded to have a length (i.e., in the long direction) that corresponds to the dimensions of the mask 130 and/or the apertures 131 on the mask 130. The beam 122 may be focused to have a width (i.e., in the narrow direction) that provides a desired effective power density. In one example, the length of the line shaped beam 122 may be in the range of about 20 mm to 35 mm, and preferably about 32 mm, and the width of the line shaped beam 122 may be in the range of about 0.1 mm to 5 mm, and preferably about 1 mm. Those skilled in the art will recognize that other shapes and dimensions are within the scope of the present invention.

In one embodiment, the mask 130 may be made of steel or other suitable materials with one or more apertures 131 formed therein. The apertures 131 may have a width (i.e., in the scanning direction) in a range of about 0.005 mm to >5 mm, a length (i.e., in the non-scanning direction) in a range of about 5 mm to >50 mm, and an area in a range of about 1 cm² to >5 cm². In general, the size of the apertures 131 may depend on the available pulse energy of the laser, the demagnification ratio (discussed below), and the required energy density on target.

To scan the line shaped beam 122 across the mask 130, the mask 130 may be translated linearly in the direction of the narrow dimension of the beam 122, as indicated by arrow 134. In one embodiment, the mask 130 may be positioned on a precision linear mask stage 136, such as an air bearing or equivalent mask stage, which may be used to control the linear translation of the mask 130. Those skilled in the art will recognize other techniques to scan the beam 122 across the mask 130, for example, by moving the laser 110, the mirror 128, or other components in the beam delivery system 120. The motion of the workpiece 140 may be coordinated with the motion of the mask 130 such that scanning the beam 122 across the mask 130 causes the pattern to be accurately imaged onto the workpiece 140, thereby machining a corresponding pattern with high resolution.

The scanning speed (e.g., the translation speed of the mask 130) may depend on the desired power density and the width of the line shaped beam 122. A narrow laser beam with high laser energy density scanned at high speeds may reduce pulse overlapping, thereby reducing the effective power density. In one example wherein the width of the beam is in the range of about 0.1 mm to 5 mm, and preferably about 1 mm, the scanning speed may be in the range of about 0.1 mm/sec to 200 mm/sec., and preferably about 80 mm/sec. A wider beam may result in higher effective power density and may require higher scanning speeds to reduce the thermal effects.

The patterned beam 132 formed by scanning the beam 122 across the mask 130 may be imaged at a reduced ratio onto the workpiece 140 to machine a pattern on the workpiece 140 that is smaller than the pattern on the mask 130. In one embodiment, the demagnification or reduction may be in a range of about 1× to >10× and preferably about 5×. In the illustrated embodiment, an imaging lens 150 provides the reduction or demagnification of the image. Those skilled in the art will recognize that other optical components may be used to provide reduction or demagnification of the patterned beam 132. The reduction or demagnification facilitates the formation of smaller features on the workpiece 140 while allowing the mask 130 to be manufactured with a larger size, thereby improving the resolution of the pattern formed on the workpiece 140.

In one embodiment, the workpiece 140 may be moved by rotating the workpiece 140 about a longitudinal axis under the patterned beam 132, as indicated by the arrow 142. Rotation of the workpiece 140 allows machining of a cylindrical surface, curved surface or other surface that wraps around the workpiece 140. In this embodiment, the workpiece 140 may be positioned on and rotated using a rotation stage 160, as is known to those skilled in the art. In one example, the rotation speed of the workpiece may be in the range of about 0.1 rpm to 10 rpm, and preferably about 1.5 rpm. The long direction of the line shaped beam 122 may be aligned along the axial direction of the rotating workpiece 140.

As shown in the illustrated embodiment, the image projected by the patterned beam 132 may be inverted by the imaging lens 150 (or other demagnification optics), as indicated by the "cross-over" point 138 in the patterned beam 132. In the case where the image is inverted, the workpiece 140 is rotated in a direction 142 opposite the linear direction 134 of the mask 130. Alternatively, the image may not be inverted (e.g., by using suitable non-inverting imaging optics) and the workpiece 140 may rotate in the same direction as the linear movement of the mask 130.

The linear translation of the mask 130 may be synchronized to the movement or rotation of the workpiece 140 such that the pattern on the mask 130 is imaged and formed on the cylindrical surface of the workpiece 140. In one embodiment, the mask translation, the part rotation and the laser may all be controlled using a controller 170, as is known to those skilled in the art. The scanning speed (e.g., the mask linear translation) and the workpiece speed (e.g., rotation) may be coordinated together with a precision laser fire-on-the-fly pulsing technique known to those skilled in the art to enable control of the power density and the feature image geometry.

Although the exemplary laser machining system and method described and shown may be advantageously used to machine a cylindrical structure made of a sensitive material, the system and method described herein may also be used to machine structures having other shapes and made of other materials. For example, the system and method may be used to machine curved surfaces on structures having other shapes and may be used to machine flat surfaces. The system and method may also be used to machine non-sensitive materials such as glass, metals, and ceramics. Although specific operating characteristics and parameters (e.g., wavelength, repetition rates, energy density, beam dimensions, scanning speeds) are described herein, those skilled in the art will recognize that the operating characteristics and parameters may vary depending upon the type of material and the desired effective power density for laser machining the material.

Figure 2:
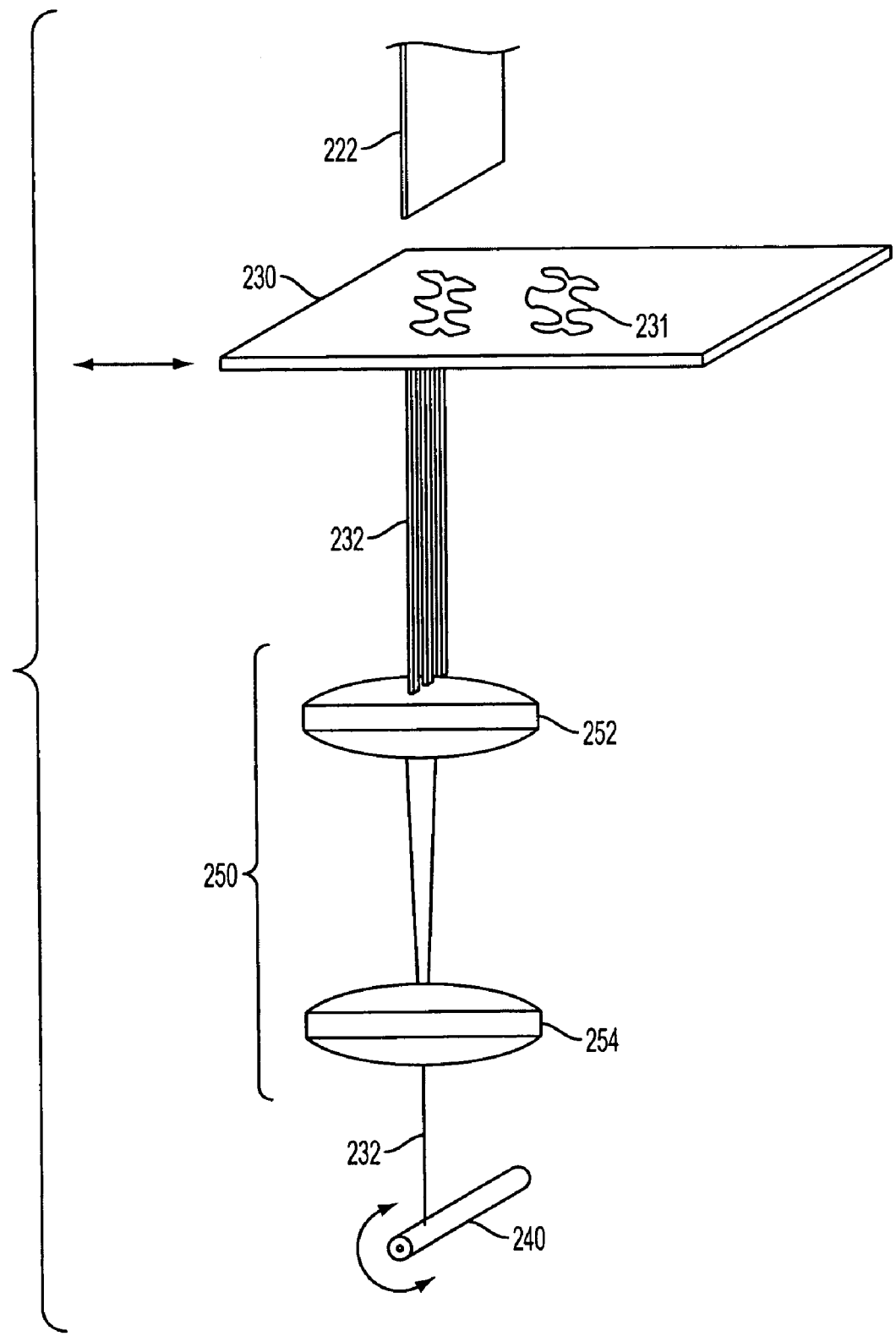
FIG. 2 is a schematic diagram illustrating another embodiment of a laser machining system and method used to machine a complex pattern in a cylindrical structure.

In one exemplary application shown in FIG. 2, a laser machining system and method, consistent with one embodiment of the present invention, may be used to machine fenestrations or openings in a tubular construction made of a bioabsorbable material to form a biomedical device having an integral self-expanding, non-elongating, bioabsorbable framework. The finished device can serve as a bioabsorable support for a body conduit. In use, the bioabsorbable device including the machined fenestrations or openings may radially expand from a compressed first diameter to an unrestrained second diameter equal to or greater than 1.5 times the first diameter within two minutes following immersion in an aqueous medium at 37 degrees centigrade without requiring an extrinsically applied force and without requiring a thermal transition. The present invention is not to be limited by this exemplary application described below.

In this example, a 248 nm gas excimer laser system (not shown in FIG. 2), such as the type available from J P Sercel Associates, Inc., Hollis, N.H. (system JPSA 100-01-INV024, model IX1000-LPX240), may be used to generate an excimer laser beam. The excimer laser may be set to produce a 110 millijoules beam, repeatedly pulsed at 200 Hz, and the energy density at the surface being machined may be 2 Joules per square centimeter. A beam delivery system, such as the type described above, may be used to optically expand and focus the excimer laser beam to form a line shaped beam 222.

One embodiment of a mask 230 used in this exemplary application may be made of 0.020 inch thick stainless steel laser cut to form a series of apertures 231 in the shape of the intended fenestrations or openings to be formed in the tubular construction. Other mask materials can also be used provided that they are structurally and thermally stable to hold desired part tolerance when moving under acceleration and while being exposed to a medium to high power laser beam. The excimer laser beam may be optically expanded to fill the rectangularly shaped aperture mask 230. In other words, the long axis of the beam 222 may be greater than the largest of the mask apertures 231 measured in the non-scanning direction. The short axis of the beam 222 may be determined by the amount of laser energy needed to minimize heat and to minimize processing time, as described above. The line shaped beam 222 may be passed through the apertures 231 of the mask 230 to form a patterned beam 232 in the form of a series of laser beamlettes, which may be rectangularly-shaped in the exemplary application.

A workpiece 240 used in this exemplary application may be a tubular construction made of a bioabsorbable material and cut to a length greater than the final desired length of the device being formed. The beamlettes 232 may be focused onto the workpiece 240 using a downstream beam delivery system 250 including, for example, an array of demagnification optics 252, 254. To create high resolution openings in the workpiece 240, the apertures 231 in the mask 230 may be larger in size than the actual openings formed in the workpiece 240 and the beamlettes 232 are reduced using the downstream delivery system 250. The size of the apertures 231 in the mask 230 relative to the size of the openings to be machined may correspond to the demagnification ratio of the downstream beam delivery system 250. In one example, the demagnification ratio is 5:1. The density of the laser energy required to cut openings in the tubular construction may also be a factor in determining this ratio.

In this embodiment, the workpiece holder (not shown in FIG. 2) may be provided by fitting the laser with attachments that permit a chuck for holding and rotating a stainless steel mandrel. The workpiece 240 may be initially placed over the mandrel, and the mandrel may be secured in the chuck and positioned. The chuck may be driven by a rotary servomotor such that the workpiece 240 is rotated in concert with movement of the mask 230 and pulsing of a controlled beam of laser energy to cut the openings in the workpiece 240.

To form each opening in this example, the excimer laser may be pulsed fifty (50) times per unit area with forty (40) microns of movement of the workpiece 240 between each pulse. The pulsed beamlettes forming the patterned beam 232 may be passed over each opening area about ten (10) times. The laser is activated as the mask 230 oscillates in a plane parallel to the short axis of the rectangular laser beam 222. In turn, the mandrel is precisely rotated about its own cylindrical axis in coordination with the oscillating mask 230. This coordinated motion replicates the mask aperture geometry onto the continuously curving surface of the workpiece 240 and enables an even application of laser energy to be applied. Laser energy may be applied to the workpiece 240 until the desired amount of material is ablated. This even application of laser energy results in precise, repeatable, ablation of the bioabsorbable material.

The mandrel and mask 230 may then be repositioned in a coordinated manner and indexed to form another opening in the workpiece 240. The process may be repeated until openings are formed in the workpiece 240 along the entire length and circumference of the tubular construction. The same process may be used with a different mask to cut both ends of the workpiece 240. When all the openings are formed and the ends are finished, the machined device may be removed from the mandrel. Prior to removing the machined device from the mandrel, the cut piece may be rinsed in isopropyl alcohol to solvent-crystallize any heat-affected material.

This exemplary excimer laser cutting process may also be used to produce openings delimited with border material having pits, holes, cavities, or other subsurface features. These features can be used as an aid in attaching a coating to the integral framework of the device. The features can also serve as reservoirs for bioactive compounds and entities. The reservoirs can also contain fillers, such as radiopaque elements or compounds. The compounds or entities can be released from the features as the bioabsorbable material undergoes bioabsorption. Alternatively, the bioactive compounds and/or entities can be released independent of the bioabsorption of the bioabsorbable device. The bioactive compounds can also be incorporated into coatings applied to surfaces of the device.

Consistent with one embodiment, a method is provided for machining a surface of a workpiece. This method comprises: generating a raw laser beam; forming the raw laser beam into a line shaped beam; moving a mask defining a pattern such that the line shaped beam is scanned across the mask to form a patterned beam; rotating the workpiece; projecting the patterned beam onto the curved surface of the workpiece as the workpiece rotates; and coordinating motion of the mask and the workpiece such that the patterned beam machines a pattern corresponding to the pattern in the mask.

Consistent with another embodiment, a laser machining system comprises: a rotation stage configured to hold and rotate a workpiece about an axis of rotation; an excimer laser configured to generate a laser beam at a wavelength of 248 nm; a beam delivery system configured to form the laser beam into a line shaped beam and to deliver the line shaped beam from the laser toward the workpiece; a mask defining a pattern and configured to pass at least a portion of the line shaped beam in the pattern; a mask stage configured to translate the mask; and a controller configured to coordinate movement of the mask with rotation of the workpiece.

Consistent with a further embodiment, a method is provided for machining a workpiece. The method comprises: generating a raw laser beam having a wavelength of 248 nm; forming the raw laser beam into a line shaped beam having a width in a range of about 0.1 mm to 5 mm; scanning the line shaped beam across a mask defining a pattern in a range of about 0.1 mm/sec to 200 mm/sec to form a patterned beam; projecting the patterned beam onto the workpiece; and coordinating motion of the mask and the workpiece such that the patterned beam machines a pattern corresponding to the pattern in the mask.

Consistent with yet another embodiment, a method is provided for laser machining a workpiece having a tubular construction and being made of a sensitive material. The method comprises: scanning a line shaped laser beam having a wavelength of 248 nm across a mask having apertures defining a pattern such that a portion of the line shaped beam passing through the apertures forms beamlettes; projecting and focusing the beamlettes onto a surface of the workpiece made of the sensitive material; and rotating the workpiece in coordination with the scanning such that the beamlettes remove at least portions of the sensitive material to form openings in the workpiece corresponding to the pattern of the apertures in the mask.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method for machining a curved surface of a workpiece, wherein said workpiece is made of a sensitive material having an optical absorption coefficient at a 248 nm wavelength that is less than about $2\times10^3$ cm$^{-1}$, said method comprising:

generating a raw laser beam having a wavelength of 248 nm, a repetition rate of at least about 200 Hz and at an energy density of at least about 2000 mJ/cm$^2$;

forming said raw laser beam into a line shaped beam;

moving a mask defining a pattern such that said line shaped beam is scanned across said mask to form a patterned beam;

rotating said workpiece;

projecting said patterned beam onto said curved surface of said workpiece as said workpiece rotates; and coordinating motion of said mask and said workpiece such that said patterned beam machines a pattern corresponding to said pattern in said mask, wherein said patterned beam machines the pattern by ablating the sensitive material of said workpiece.

2. The method of claim 1 wherein a length of said line shaped beam is in a range of about 20 mm to 35 mm and a width of said line shaped beam is about 0.1 mm to 5 mm.

3. The method of claim 2 wherein a scanning speed of said line shaped beam across said mask is in a range of about 0.1 mm/sec to 200 mm/sec.

4. The method of claim 3 wherein a rotation speed of said workpiece is in a range of about 0.1 rpm to 10 rpm.

5. The method of claim 1 wherein said scanning speed of said line shaped beam across said mask is at least about 80 mm/sec, and wherein a rotation speed of said workpiece is at least about 1.5 rpm.

6. The method of claim 5 wherein a length of said line shaped beam is in a range of about 20 mm to 35 mm and a width of said line shaped beam is about 0.1 mm to 5 mm.

7. The method of claim 1 wherein said workpiece is tubular.

8. The method of claim 7 wherein said pattern is machined through said workpiece.

9. The method of claim 1 further comprising demagnifying said patterned beam projected onto said workpiece.

10. The method of claim 9 wherein said patterned beam is demagnified at ratio of 5:1.

11. The method of claim 1 wherein said patterned beam includes a plurality of beamlettes.

12. The method of claim 11 wherein projecting said patterned beam includes passing said beamlettes through demagnification optics.

* * * * *